Feb. 22, 1949.  A. B. JENNINGS  2,462,503
PHOTOGRAPHIC PLURAL EMULSION LAYER STRIPPING FILM
Filed March 5, 1946
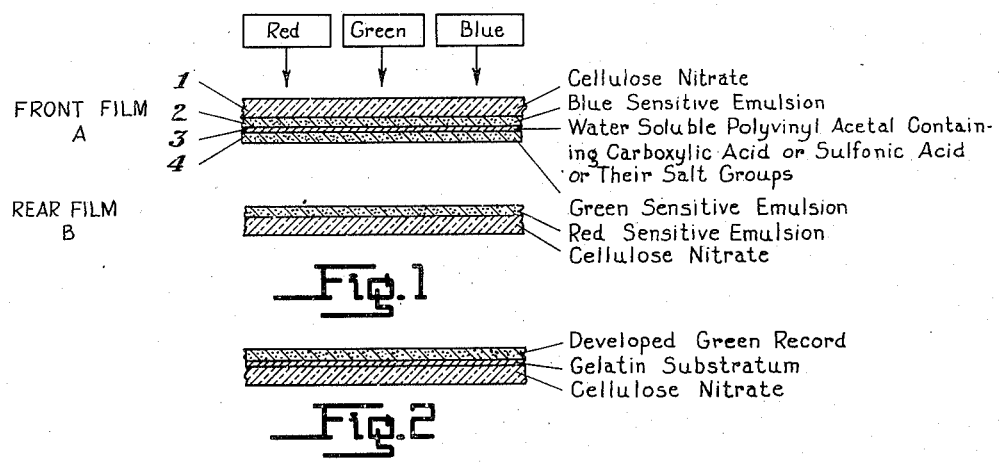
Andrew Bradshaw Jennings  INVENTOR.
BY
*Lynn Barratt Morris*
ATTORNEY Patented Feb. 22, 1949

2,462,503

UNITED STATES PATENT OFFICE 2,462,503

PHOTOGRAPHIC PLURAL EMULSION LAYER STRIPPING FILM

Andrew Bradshaw Jennings, New Brunswick, N. J., assignor to E. I. du Pont de Nemours & Company, Wilmington, Del., a corporation of Delaware Application March 5, 1946, Serial No. 651,996

9 Claims. (Cl. 95—2)

This invention relates to color photography and, more particularly, to photographic films and processes of producing color separation records therefrom. More particularly, it relates to bipack photographic films, one of the film elements of which will record two different color separation records, and to processes for obtaining individual color separation records therefrom.

An object of this invention is to provide new and useful multipack photographic films. A further object is to provide bipack films for recording three-color separation records which can be utilized to readily reproduce three individual color separation records. A still further object is to provide a bipack film with one element for recording two color separation records from which one record can readily be removed and can be further utilized in a reproduction process. Another object is to provide novel processes for obtaining color separation records from such a bipack. Still other objects will be apparent from the following description of the invention.

It has been found that novel bipack photographic films which are relatively easy to manufacture can be readily processed to three-color separation negatives by the following methods.

The front film for the novel bipack is made by coating a suitable film base on one side with a water-permeable colloid-silver halide emulsion, a layer composed of a water-soluble macromolecular acetal of vinyl alcohol polymers with an aldehyde containing carboxylic acid and/or sulfonic acid groups, or water-soluble salts of such acid groups, said layer being free from light-sensitive silver salts is then coated on the resulting layer after it has dried, then there is coated on the latter colloid layer a layer of a water-permeable colloid-silver halide emulsion. The respective silver halide layers are so disposed and/or sensitized that each is sensitive to a different primary color region of the visible spectrum. The innermost layer is generally sensitive to blue light, whereas the outermost layer may be sensitive, in addition, to green or red light. A light screening dye or pigment is either placed in the innermost layer or in the intermediate polyvinyl acetal layer free from silver halides. For example, either the blue-sensitive layer or the screening layer contain colloidal silver and it is preferably yellow in color so that it has blue light absorption characteristics and will allow green and red light to expose the remaining layers. Other types of colloidal or inert silver may be used, however, in conjunction with a yellow filter dye which may be placed in the emulsion or separator layer.

The water-soluble macromolecular acetals can be made by the reaction of a vinyl alcohol polymer, including interpolymers, with an aldehyde containing a sulfonic acid or a corboxylic acid group under acetal-forming conditions. For example, the acetalization may be conveniently carried out in solution or suspension in water or an organic solvent or diluent using a catalyst such as phosphoric acid, sulfuric acid, hydrochloric acid, etc. Suitable procedures and aldehydes are described in United States Patent 2,310,943 and in German Patent No. 643,650. The free acid groups can be converted into salt groups by a simple neutralization as described above and in the United States patent.

Partially and completely hydrolyzed polyvinyl alcohols of low, intermediate, and high viscosity, having a molecular weight of 5,000 to 50,000 and hydrolyzed interpolymers of vinyl esters with one or less equivalent of a terminally unsaturated interpolymerizable organic compounds can be used in preparing the vinyl alcohol acetals of aldehydes containing carboxylic or sulfonic acid groups. In general, such polymers having for each 100 carbon atoms between 20 and 50 free non-phenolic hydroxyl groups are useful.

Water-soluble, macromolecular, neutralized acetals of vinyl alcohol polymers useful in accordance with this invention are prepared by acetalization from (1) polyvinyl alcohol of high molecular weight (viscosity of 4% aqueous solution at 20° C., 40 to 60 centipoises), (2) polyvinyl alcohol of medium molecular weight (viscosity of 4% aqueous solution at 20° C., 15 to 30 centipoises) which may be substituted with acetate, propionate, acetal, propional, and butyral groups, and (3) 75 to 100% hydrolyzed interpolymers of vinyl acetate with 0.05 to 0.5 mol equivalents of terminally unsaturated mono-olefins, e. g., ethylene, such as described in Roland United States Patent No. 2,386,347, and (4) completely hydrolyzed interpolymers of vinyl acetate with minor portion (less than 50%) of polymerizable vinyl or vinylidene compounds, for example, vinyl chloride, vinyl cyanide, alkyl methacrylates, e. g., methyl and ethyl methacrylate, etc., with an aldehyde containing carboxylic or a sulfonic acid group.

The preferred polyvinyl acetals have the above properties and, in addition, are colorless or substantially colorless and are free from color former nuclei.

The degree of substitution of the acetal groups may vary over a wide range. Thus, vinyl alcohol polymers having between 5 and 60% of the hydroxyl groups acetalized with acidic aldehydes have been found useful. However, it has been found that the best results are obtained when between 10 and 35% of the hydroxyl groups are acetalized with the acidic aldehydes. The total acetal content based on these figures will vary depending on the hydroxyl content of the polymer, but it has been found that the best results are obtained when between 5 and 17% of the carbon atoms of the polymer chain contain the acetal groups with —COO— and —$SO_3$— radicals. The acetals having this degree of substitution, however, may be used in the form of the free acids but are preferably used in the form of the water-soluble salts which are soluble to the extent of at least 5% at temperatures below 30° C. in methanol or ethanol containing up to 20% of water.

While any aldehyde containing a free carboxylic or sulfonic acid radical may be used in preparing these acetals, those having a molecular weight of less than 200 are preferred as, in general, they react more readily and completely. These aldehyde-acids may be aromatic, aliphatic, or mixed aromatic-aliphatic.

The water-soluble macromolecular acetals of vinyl alcohol polymers described above can be applied to the contiguous layer from a solution or dispersion in the same general manner that gelatin overcoatings are applied. The acetal layers so applied should be of such a thickness that they may be readily stripped from the layer on which they are coated. The exact thicknesses can be readily determined by experiment. Thicknesses of 0.0001 to 0.0005 inches, in general, are satisfactory. Materially thinner layers, e. g., 0.05 to 2.0 microns, in general, adhere quite firmly. They may be applied from aqueous or organic solvent solutions. Useful solvents are the water-soluble alcohols, e. g., methanol, ethanol; acetone, dioxane, etc. Mixtures of such solvents with water are quite useful. The coating solutions are preferably substantially neutral. Their pH can be adjusted by neutralizing the free acid groups with bases capable of yielding water-soluble salts, e. g., alkali metals, ammonia, and amines.

The rear film for the novel bipack merely consists of a transparent film base which carries a light-sensitive silver halide water-permeable colloid emulsion layer. The emulsion layer is sensitive to red or green light. The composite film is shown in Fig. I of the accompanying drawing in a schematic relationship. In use the elements of the bipack are in contact.

In using the film, the two emulsion surfaces of the front film element A and the rear film element B are placed in a camera so that the front film is first exposed through the base. The two films are then developed whereby three-color separation records are formed in the respective layers of the bipack element. The color-separation records of the front film are then separated by stripping the green sensitive record of element A, as shown in Fig. I, from the remaining record. The former record is then transferred to a film support known as a "blank" while the combination is then fixed, washed, and dried. The film element may be transferred to a "blank" and the blue sensitive record stripped from the green record affixed to the blank, if desired, and the latter record may then be fixed, washed, and dried. The blue and red records may be fixed, washed, and dried in like manner. Color prints made from the separated developed records are then superimposed in register on a transparent support whereby a positive multi-color picture is formed.

In the preferred aspect of the invention, a novel front film element is made by depositing on a transparent film base 1 a blue-sensitive gelatino-silver halide emulsion having dispersed therethrough yellow colloidal silver to form layer 2. Next there is coated a layer 3 composed of a macromolecular polyvinyl acetal as aforedescribed upon which is deposited an ortho-sensitized gelatino-silver halide emulsion to form layer 4. The film element just described is placed in contact with a rear film element having a panchromatic gelatino-silver halide emulsion layer, as described above, and exposed to a color scene. The film elements are developed in an ordinary developer. The developed front film element may then be treated, as described above, either before or after transfer to a second registered support with an aqueous solution which effectively weakens the polyvinyl acetal layer and permits the separation of the two records. Color prints can be made from each of the records as described above.

The yellow colloidal silver used in the elements can be made by adding solution B to A (which follow) at a temperature of 80° F. slowly with stirring.

Solution A

| | Grams |
|---|---|
| $AgNO_3$ (crystals) | 20 |
| Gelatin | 150 |
| Water | 2000 |

Solution B

| | | |
|---|---|---|
| Diphenyl carbazide | grams | 7.28 |
| Ethanol | cc | 728.00 |
| $NH_4OH$ (conc.) | drops | 12.00 |

The resulting solution was set by cooling and was pressed through a die to form noodles which were cut into short lengths and washed several times. This and other methods for making yellow colloidal silver dispersions thereof are described in copending application Serial No. 590,390, filed April 26, 1945, now abandoned, and can be used in carrying out the present invention.

The invention will be further illustrated by the following exemplary procedures, but it is not to be limited to them.

Example I

A cellulose nitrate film base having a thin gelatin coating was coated with a gelation-silver iodobromide emulsion which had admixed therewith 50% by weight based on the silver salt of yellow colloidal silver, prepared as described above, to a weight of 52 mg. AgBr per sq. dec. After drying a mixture of 44 parts of 100% hydrolyzed polyvinyl acetate (medium viscosity—molecular weight 15,000 to 20,000), 40 parts of glacial acetic acid, 40 parts of sodium benzaldehyde-o-sulfonic acid-monohydrate, and 6 parts of 85% phosphoric acid is stirred at 75° to 80° C. for one to two hours. The product is then precipitated by the addition of 1000 parts each of acetone, and dried to give 75 parts of a white solid. A solution containing 50 grams of this acetal per 1000 grams of 90% ethanol was digested 45 minutes at 125° F., cooled to 90° F. and coated to form a layer .0001 inch thick. A gelatino-silver iodobromide emulsion containing 1,1'-diethyl-2,2'-cyanine iodide as an ortho-sensitizing dye was coated on the acetal layer to a weight of 48 mg. per sq. dec. A gelatin solution containing 450 grams of gelatin per 14,400 grams of water was coated in like manner to form a thin anti-abrasion layer. This film element constitutes the front film A of a bipack.

A similar film base was coated with thin gelatin substratum and dried. A gelatino-silver iodobromide emulsion containing as a green blind sensitizing dye 1,1'-diethyl-2,4-carbocyanine iodide was coated on the gelatin substratum. It constitutes the rear film of a bipack.

The two films were placed with the gelatin layers in contact and exposed to a color scene and processed as follows:

(1) Developed for ten minutes in a developer made by admixing the following components:

| | |
|---|---|
| Hydroquinone | grams__ 7.5 |
| Metol | do____ 5.0 |
| Sodium sulfite (anhydrous) | do____ 60.0 |
| Sodium carbonate (anhydrous) | do____ 50.0 |
| Potassium bromide | do____ 4.5 |
| Water | liter__ 1.0 |

(2) Treated for two minutes in an aqueous stop bath of the composition:

| | Volumes |
|---|---|
| Acetic acid (28%) | 1 |
| Water | 20 |

(3) The outer layer of the film A was then pressed into intimate contact with a second registered support comprising a transparent film base coated with a gelatin layer having a coating weight of about 75 mg. per sq. dec. which had been wetted to promote adhesion between the gelatin surfaces of the respective elements. During the period of contact, the water in the plain gelatin layer permeated the contiguous developed green sensitive layer and wetted the polymeric acetal layer loosening the bond between it and the green sensitive layer which adheres to the gelatin layer of the second support and the resulting element has the structure shown in Fig. II. The latter element may then be fixed, washed, and dried. The element stripped from the latter element, as well as the rear film of the bipack, can be fixed, washed, and dried in like manner resulting in 3-developed color separation negatives suitable for registration color printing.

Example II

A photographic film as described in Example I was developed and put through a stop bath for two minutes as described in that example. The developed film was then given a water rinse and was then immediately squeegeed into intimate contact with a dry registered gelatin coated film blank which had been previously humidified to bring about necessary swelling to permit registration. The "dry" surface of the blank afforded instantaneous adhesion for layer 4 of Fig. I. The water adsorbed by the rinse penetrated the front film element and weakened the bond between the polymeric acetal surface and the outer emulsion layer so that it could be stripped in about one second from the appertaining layer which adhered to the gelatin layer of the blank.

Example III

A cellulose nitrate film base having a thin gelatin substratum was coated with a gelatino-silver iodobromide emulsion which had dispersed therein 1 gram of tartrazine per 50 grams of gelatin, to a weight of 65 mg. of AgBr per sq. dec. After drying, a 5% alcohol-water solution of a polyvinyl acetal made as follows was applied to give a coating weight of 30 mg. per sq. dec.:

A mixture of 300 parts of a medium viscosity polyvinyl alcohol (100% hydrolyzed polyvinyl acetate having a molecular weight of 15,000 to 20,000), 120 parts of sodium benzaldehyde-o-sulfonate monohydrate, 300 parts of water, 1200 parts of 85% ethanol, and 12 parts of 85% phosphoric acid were stirred at 75° to 80° C. for one hour. Two thousand (2,000) parts of acetone were added and the precipitate was filtered and reslurried in methanol, neutralized with aqueous ammonium hydroxide solution, filtered, and slurried again in methanol, and then twice in acetone. A yield of 345 parts of a water-soluble sodium benzaldehyde-o-sulfonate acetal was produced. Analysis: S=2.9% and Na=1.8%.

A gelatino-silver iodobromide emulsion sensitized to red with 1,1'-diethyl-2,4-carbocyanine iodide was coated on the polymeric acetal layer to a weight of 55 mg. per sq. dec. This film constitutes the front film of a bipack.

A similar film base was coated with a thin gelatin substratum. A green sensitive gelatino-silver iodobromide emulsion containing 1,1'-diethyl-2,2'-cyanine iodide was coated over the substratum to give the rear film element of the bipack. The film elements when exposed and processed after the manner described in Example I yielded three-color separation negatives from which there could be printed three corresponding positives.

Example IV

A cellulose nitrate film base was provided with a thin gelatin substratum upon which was coated a gelatin silver iodobromide emulsion containing tartrazine as a yellow filter dye. Upon this layer was coated a layer of polyvinyl acetal of the same kind and in the manner described in Example III. A gelatino-silver iodobromide emulsion which contained a sensitizing dye which conferred substantial sensitivity to the red region of the spectrum and Congo red as a red filter dye was coated on the polyvinyl acetal layer. This film constituted the front film of a bipack which was exposed through the base.

The rear film of the bipack was prepared by coating a gelatino-silver iodobromide emulsion containing a panchromatic sensitizing dye onto a cellulose nitrate film base having a thin gelatin substratum coating. The resulting film may be exposed and processed in accordance with the procedures in any of the foregoing examples.

The invention is not limited to the particular constructions described above. On the contrary, two differentially sensitive emulsion layers can be used as the rear element or a bipack, said layers being sensitive to the red and green regions of the spectrum. Suitable elements may have such colloid-silver halide layers separated by a strippable layer of the aforesaid water-soluble acetals which may contain an appropriate filter dye or pigment to screen out light of undesired wave-lengths. The front film may then have a single blue sensitive colloid silver halide emulsion layer and may contain a yellow filter dye or pigment.

Various hydrophilic colloid binding agents can be used in place of the gelatin of the light-sensitive silver salts or for the "blanks." They may be either natural or synthetic colloids. Suitable materials include hydrophilic modified polyvinyl alcohol and its ethers, esters, and acetals, hydrophilic nylons, agar agar, albumin, etc.

An advantage of the present invention is that it enables the photographic technician to produce three-color separation negatives of high quality in a shorter time and utilizing the slightly modified equipment and facilities of a commercial laboratory.

A further advantage resides in the fact that the removable upper light sensitive layer of the front film after development is not destroyed but can readily be separated and used as a color separation negative for the printing of positives. Thus at least two time consuming tedious steps are eliminated from prior reproduction procedures.

Heretofore it has not been possible to make three original and separate color separation negatives except by subtraction printing operations and destruction of one original record or by the use of a beam splitting camera. The present invention readily admits of the preparation of such original and separate negatives and provides a film which can be used in an ordinary camera. This is an important commercial advantage of the invention.

As many widely different embodiments of this invention can be made without departing from the spirit and scope thereof, it is to be understood that the invention is not to be limited except as defined by the claims.

What is claimed is:

1. A photographic element comprising a transparent film base having superimposed thereon in order a water-permeable colloid silver halide layer which is predominantly sensitive to at least the blue region of the visible spectrum, a removable water-soluble, light-insensitive colloid layer composed of a water-soluble acetal of a vinyl alcohol polymer with an aldehyde containing a group taken from the class consisting of free sulfonic acid groups, free carboxylic acid groups, and their water-soluble salts but which aldehyde is otherwise unsubstituted and a water-permeable colloid silver halide layer which is sensitive to the blue region of the spectrum and at least one primary color region of the spectrum different from that of the first layer.

2. A photographic element comprising a transparent film base having superimposed thereon in order a water-permeable colloid silver halide layer which is predominantly sensitive to at least the blue region of the visible spectrum, a removable water-soluble, light-insensitive colloid layer composed of a water-soluble acetal of a vinyl alcohol polymer with an aldehyde containing a group taken from the class consisting of free sulfonic acid groups, free carboxylic acid groups, and their water-soluble salts but which aldehyde is otherwise unsubstituted and a water-permeable colloid silver halide layer which is sensitive to the blue region of the spectrum and at least one primary color region of the spectrum different from that of the first layer, said acetal layer containing a light filter dye.

3. A photographic element comprising a transparent film base having superimposed thereon in order a water-permeable colloid silver halide layer which is sensitive to blue light, a removable water-soluble, light-insensitive colloid layer composed of a water-soluble acetal of a vinyl alcohol polymer with an aldehyde containing a group taken from the class consisting of free sulfonic acid groups, free carboxylic acid groups, and their water-soluble salts but which aldehyde is otherwise unsubstituted, and a water-permeable colloid silver halide layer which is sensitive to a different primary color region of the visible spectrum.

4. A photographic element comprising a transparent film base having superimposed thereon in order a water-permeable colloid silver halide layer which is sensitive to blue light, a removable water-soluble, light-insensitive colloid layer composed of a water-soluble acetal of a vinyl alcohol polymer with an aldehyde containing a group taken from the class consisting of free sulfonic acid groups, free carboxylic acid groups, and their water-soluble salts but which aldehyde is otherwise unsubstituted, and a water-permeable colloid silver halide layer which is sensitive to a different primary color region of the visible spectrum, said acetal being colorless and free from color former nuclei.

5. A photographic element comprising a transparent film base having superimposed thereon in order a water-permeable colloid silver halide layer which is sensitive to blue light, a removable water-soluble, light-insensitive colloid layer composed of a water-soluble acetyl of a vinyl alcohol polymer with an aldehyde containing a group taken from the class consisting of free sulfonic acid groups, free carboxylic acid groups, and their water-soluble salts but which aldehyde is otherwise unsubstituted, and a water-permeable colloid silver halide layer which is sensitive to a different primary color region of the visible spectrum, at least one of said inner layers containing a yellow filter material.

6. A photographic element comprising a transparent film base having superimposed thereon in order a water-permeable colloid silver halide layer which is sensitive to blue light, a removable water - soluble, light - insensitive colloid layer composed of a water-soluble salt of a vinyl alcohol polymer with an aldehyde containing a sulfonic acid group taken from the group consisting of alkali metal, ammonium, and amine salts but which aldehyde is otherwise unsubstituted and a water-permeable colloid silver halide layer which is sensitive to a different primary color region of the visible spectrum, at least one of said inner layers containing a yellow filter material.

7. A photographic element comprising a transparent film base having superimposed thereon in order a water-permeable colloid silver halide emulsion layer which is sensitive to blue light, a removable, water-soluble, light-insensitive colloid layer composed of an alkali metal salt of polyvinyl acetal of a benzaldehyde sulfonic acid said sulfonic acid group being the only substituent in said benzaldehyde, and a green sensitive silver halide layer.

8. A photographic element comprising a transparent film base having superimposed thereon in order a water-permeable colloid silver halide layer which is sensitive to blue light, a removable water-soluble, light-insensitive colloid layer composed of a water-soluble acetyl of a vinyl alcohol polymer with an aldehyde containing a group taken from the class consisting of free sulfonic acid groups, free carboxylic acid groups, and their water-soluble salts but which aldehyde is otherwise unsubstituted, and a water-permeable colloid silver halide layer which is sensitive to green light, at least one of said inner layers containing a yellow filter material.

9. A photographic element comprising a transparent film base having superimposed thereon in order a water-permeable colloid silver halide emulsion layer which is sensitive to blue light, a removable water-soluble, light-insensitive colloid layer composed of the sodium salt of the polyvinyl acetal of benzaldehyde-o-sulfonic acid, and a green sensitive silver halide emulsion layer.

ANDREW BRADSHAW JENNINGS.

REFERENCES CITED

The following references are of record in the file of this patent:

UNITED STATES PATENTS

| Number | Name | Date |
| --- | --- | --- |
| 2,182,814 | Marasco | Dec. 12, 1939 |
| 2,297,732 | Woodward | Oct. 6, 1942 |
| 2,358,836 | Swan | Sept. 26, 1944 |
| 2,367,665 | Capstaff et al. | Jan. 23, 1945 |

FOREIGN PATENTS

| Number | Country | Date |
| --- | --- | --- |
| 546,631 | Great Britain | July 22, 1942 |

Certificate of Correction

Patent No. 2,462,503.         February 22, 1949.

ANDREW BRADSHAW JENNINGS

It is hereby certified that errors appear in the printed specification of the above numbered patent requiring correction as follows:

Column 8, line 30, claim 5, and line 69, claim 8, for "acetyl" read *acetal*; and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*